(12) United States Patent
Bauersachs et al.

(10) Patent No.: US 7,600,816 B2
(45) Date of Patent: Oct. 13, 2009

(54) SEAT MODULE, A MOTOR VEHICLE SEAT, A MEMORY DEVICE FOR LONGITUDINAL RAIL GUIDE FOR A MOTOR VEHICLE SEAT

(75) Inventors: Andrea Bauersachs, Ebersdorf (DE); Andreas Prause, Coburg (DE); Gregor Kröner, Bischberg (DE); Wolfgang Suck, Coburg (DE); Alwin Macht, Ebensfeld (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 451 days.

(21) Appl. No.: 10/571,205

(22) PCT Filed: Aug. 27, 2004

(86) PCT No.: PCT/DE2004/001935

§ 371 (c)(1),
(2), (4) Date: Mar. 7, 2006

(87) PCT Pub. No.: WO2005/025927

PCT Pub. Date: Mar. 24, 2005

(65) Prior Publication Data

US 2007/0001498 A1    Jan. 4, 2007

(30) Foreign Application Priority Data

Sep. 9, 2003    (DE) .............................. 203 14 237 U

(51) Int. Cl.
*A47C 1/00* (2006.01)
(52) U.S. Cl. .................. 297/341; 297/378.12; 248/429; 248/430

(58) Field of Classification Search .................. 297/341, 297/378.12; 248/429, 430
See application file for complete search history.

(56) References Cited

U.S. PATENT DOCUMENTS 6,098,946 A * 8/2000 Sechet et al. ................. 248/424

(Continued)

FOREIGN PATENT DOCUMENTS

DE        196 17 690 A1    11/1997

(Continued)

OTHER PUBLICATIONS

International Search Report. dated Feb. 8, 2005, corresponding to PCT/DE2004/001935.

(Continued)

*Primary Examiner*—Laurie K Cranmer
(74) *Attorney, Agent, or Firm*—Christie, Parker & Hale, LLP

(57)    ABSTRACT

A memory device, for a rail longitudinal guide for a motor vehicle seat, comprising two longitudinal guide rails displaceable towards each other, for the setting of the longitudinal seat position, a first memory module, which may be displaced along one of the two guide rails to set a memory position, a locking device for locking a set memory position, a second memory module, arranged on the second of the guide rails and a stop which, on reaching a relative position of the two guide rail corresponding to one of the memory positions, engages with a counter stop on the first memory module. The second memory module comprises a base body made from plastic, by which the latter is fixed to the second guide rail.

33 Claims, 12 Drawing Sheets

U.S. PATENT DOCUMENTS

| | | | |
|---|---|---|---|
| 6,227,596 B1 * | 5/2001 | Foucault et al. | 296/65.13 |
| 6,631,952 B1 | 10/2003 | Liebetrau et al. | |
| 6,799,800 B2 * | 10/2004 | Klahold et al. | 297/341 |
| 2004/0164600 A1 | 8/2004 | Rausch et al. | |
| 2004/0169409 A1 | 9/2004 | Rausch et al. | |

FOREIGN PATENT DOCUMENTS

| | | |
|---|---|---|
| DE | 299 10 720 U1 | 9/1999 |
| DE | 202 10 895 U1 | 10/2002 |
| DE | 101 27 151 A1 | 11/2002 |
| DE | 101 27 152 A1 | 11/2002 |
| DE | 101 27 153 A1 | 11/2002 |
| DE | 101 51 762 A1 | 5/2003 |
| FR | 2 173 442 | 10/1973 |
| WO | WO 00/55002 | 9/2000 |

OTHER PUBLICATIONS

English Translation of the International Preliminary Examination Report, dated Jul. 3, 2006, for corresponding PCT application PCT/DE2004/001935.

* cited by examiner

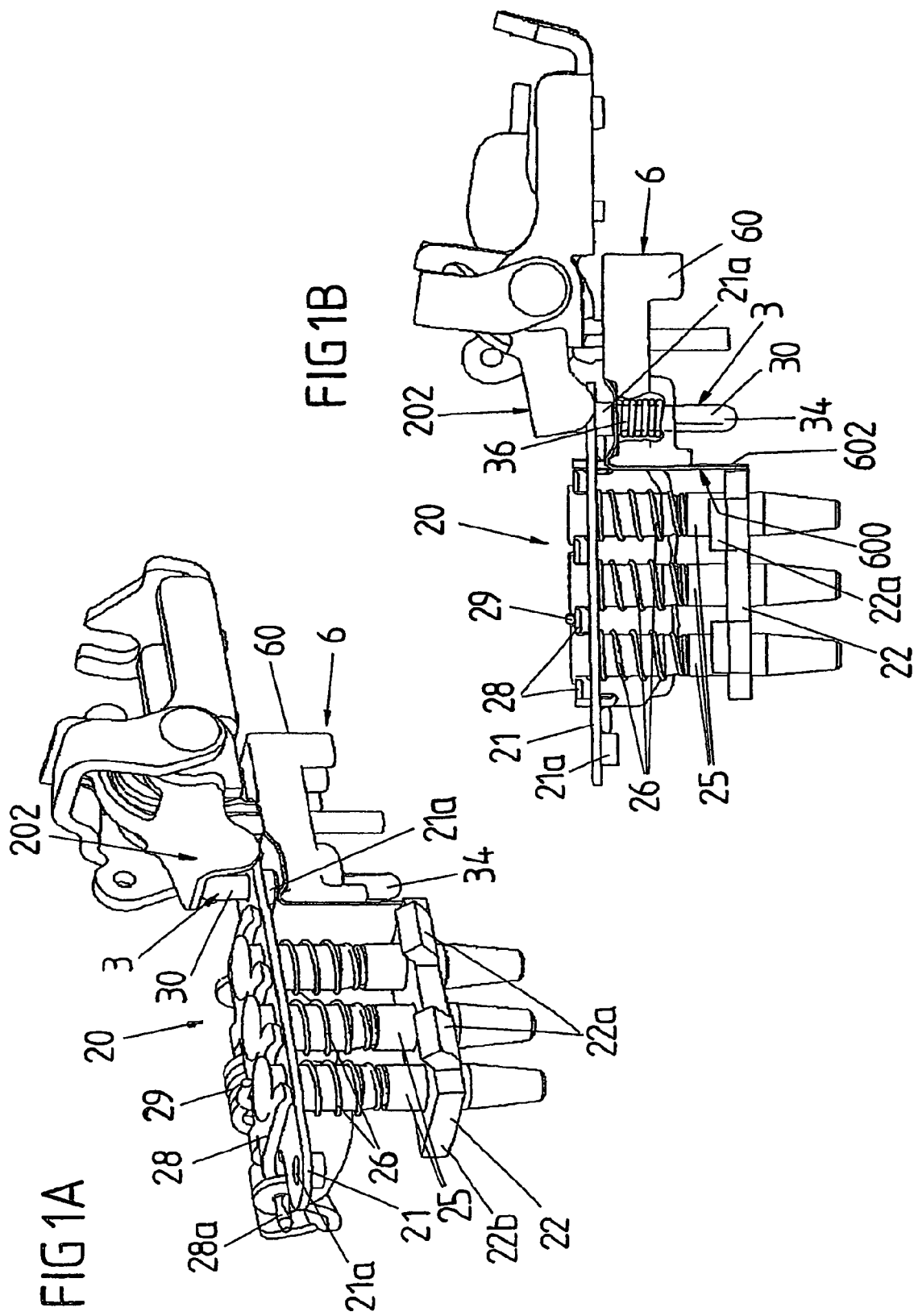

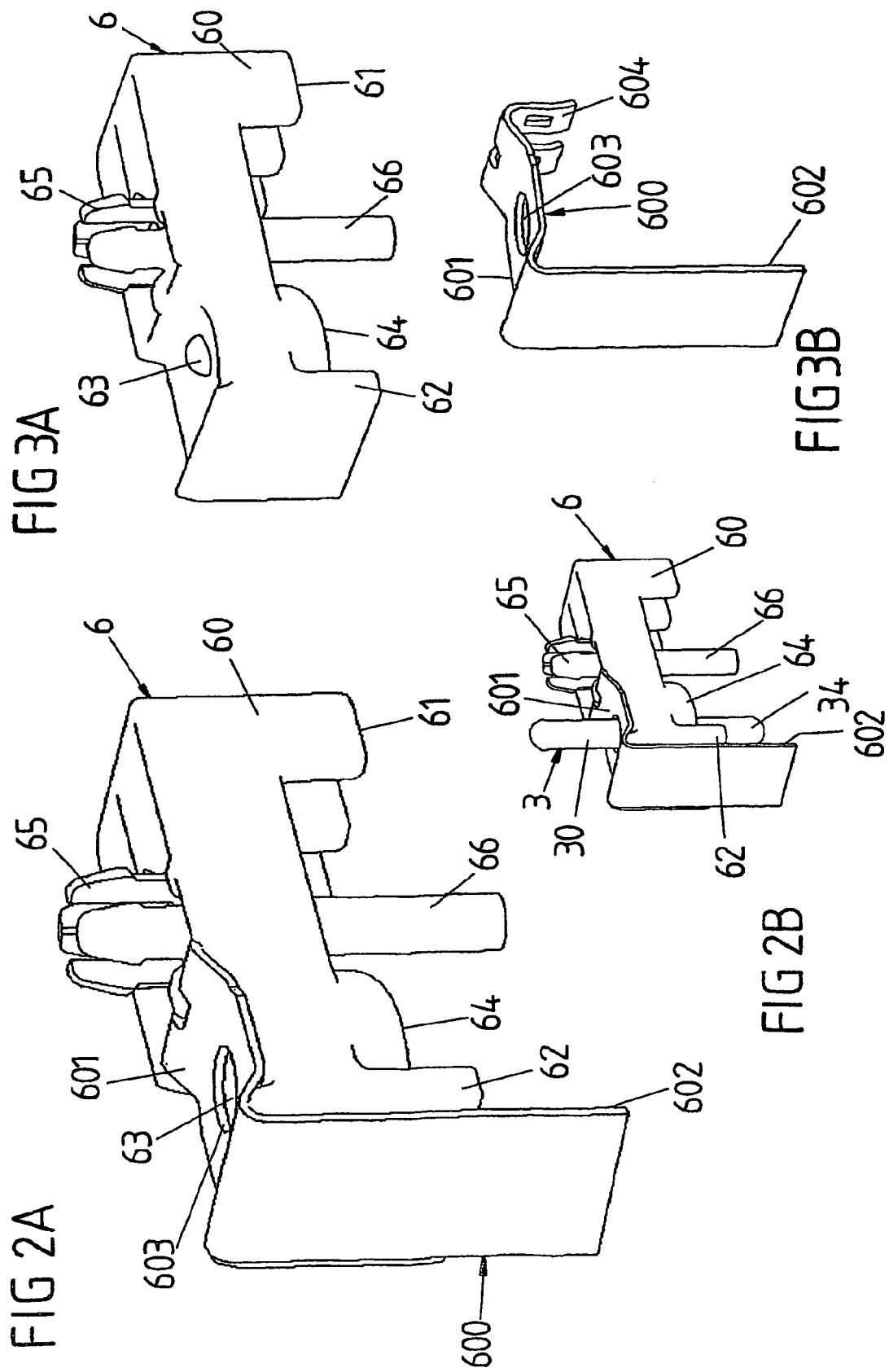

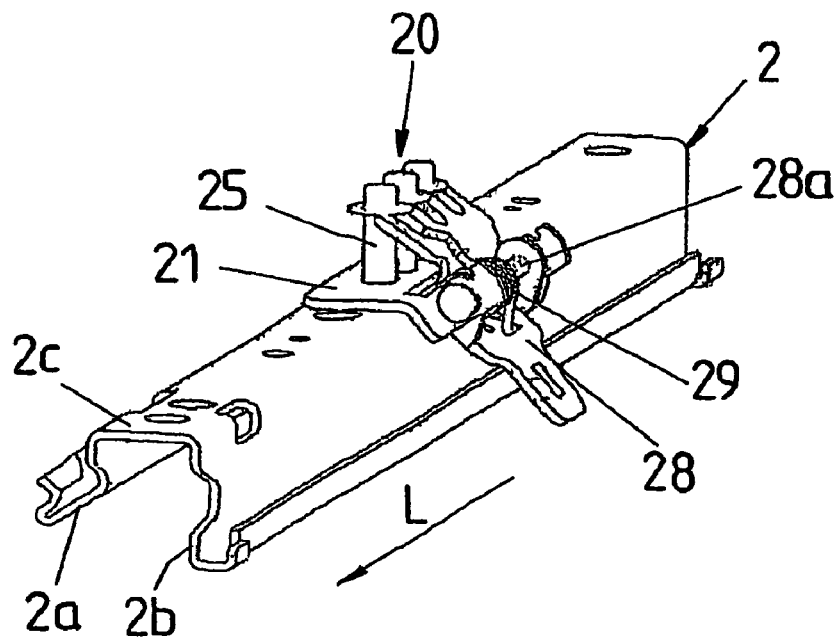
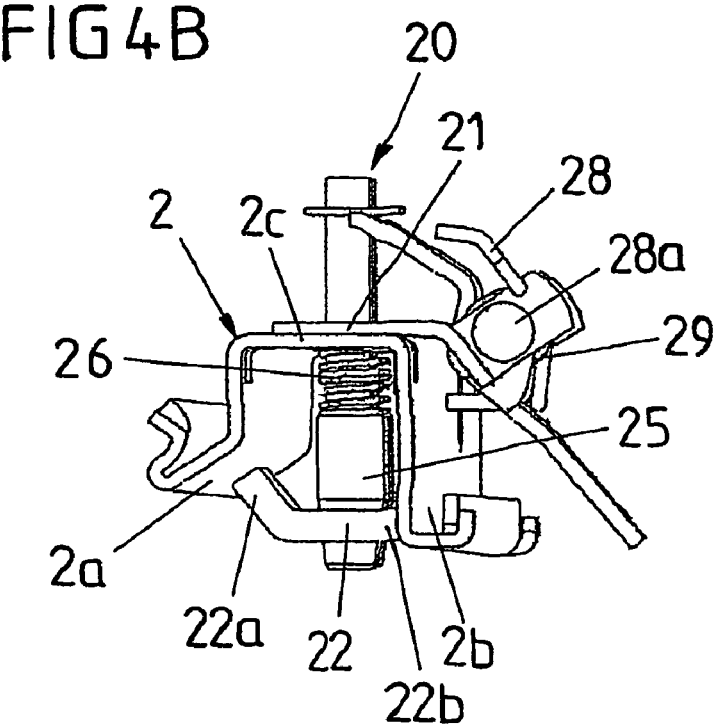

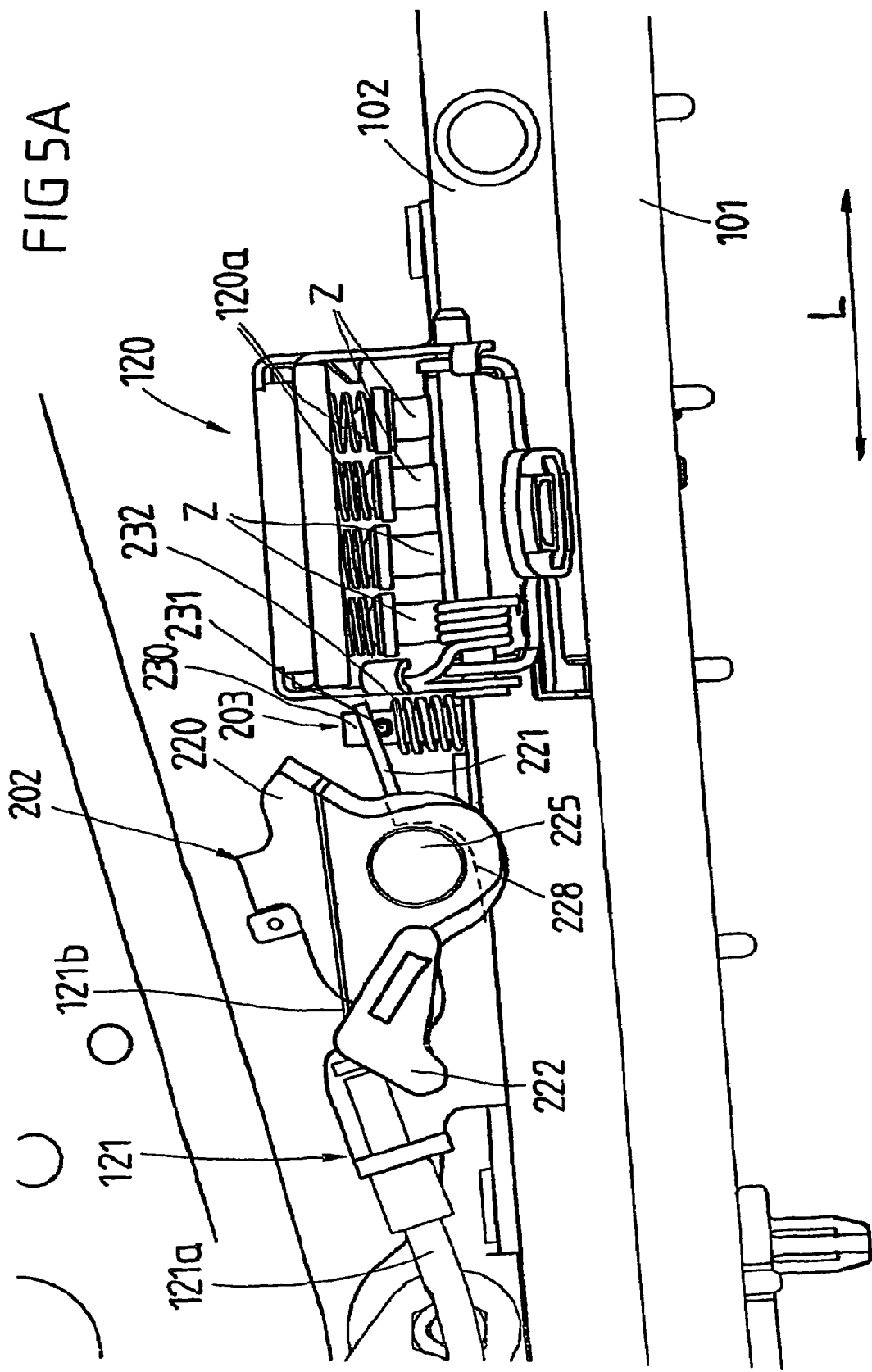

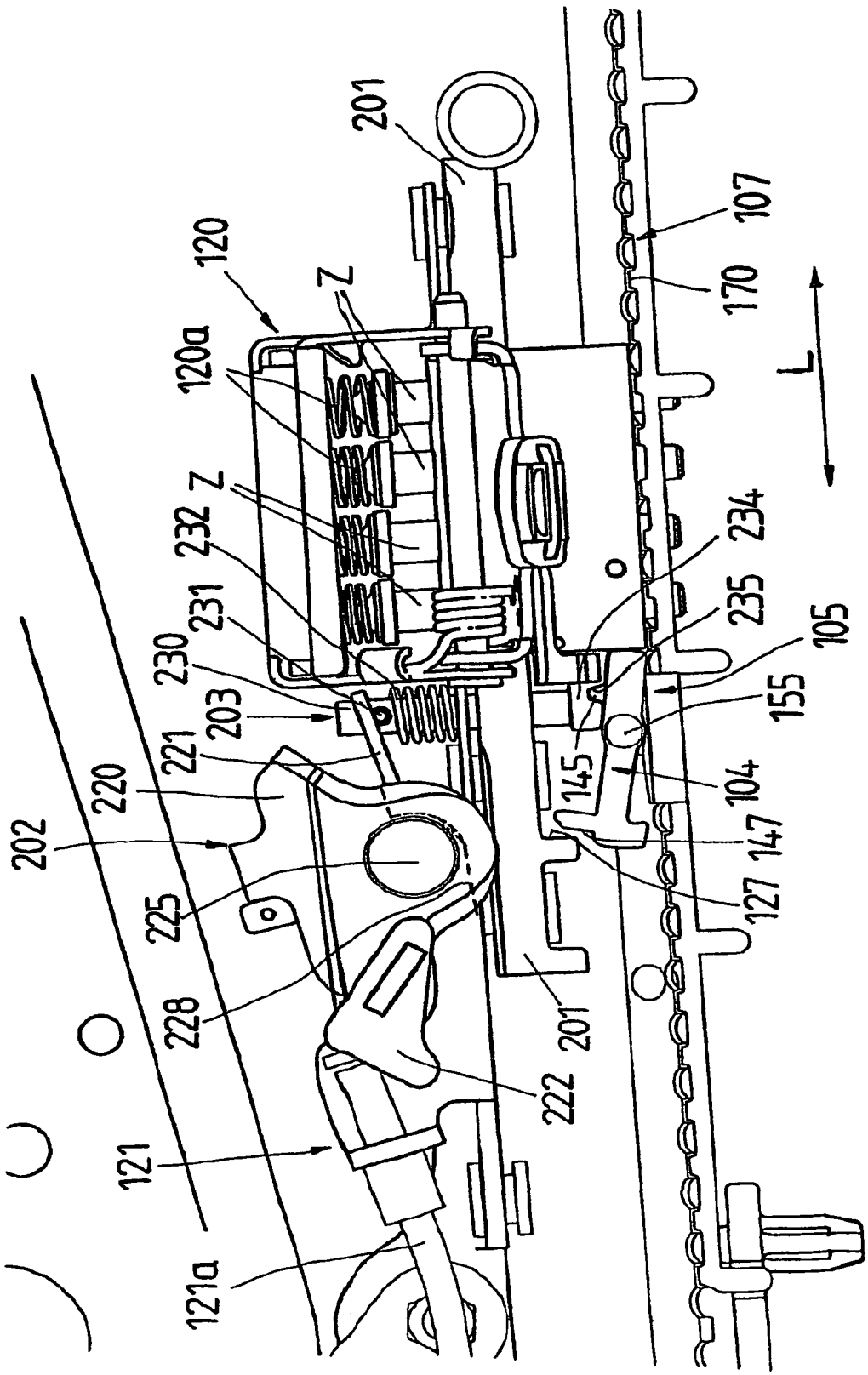

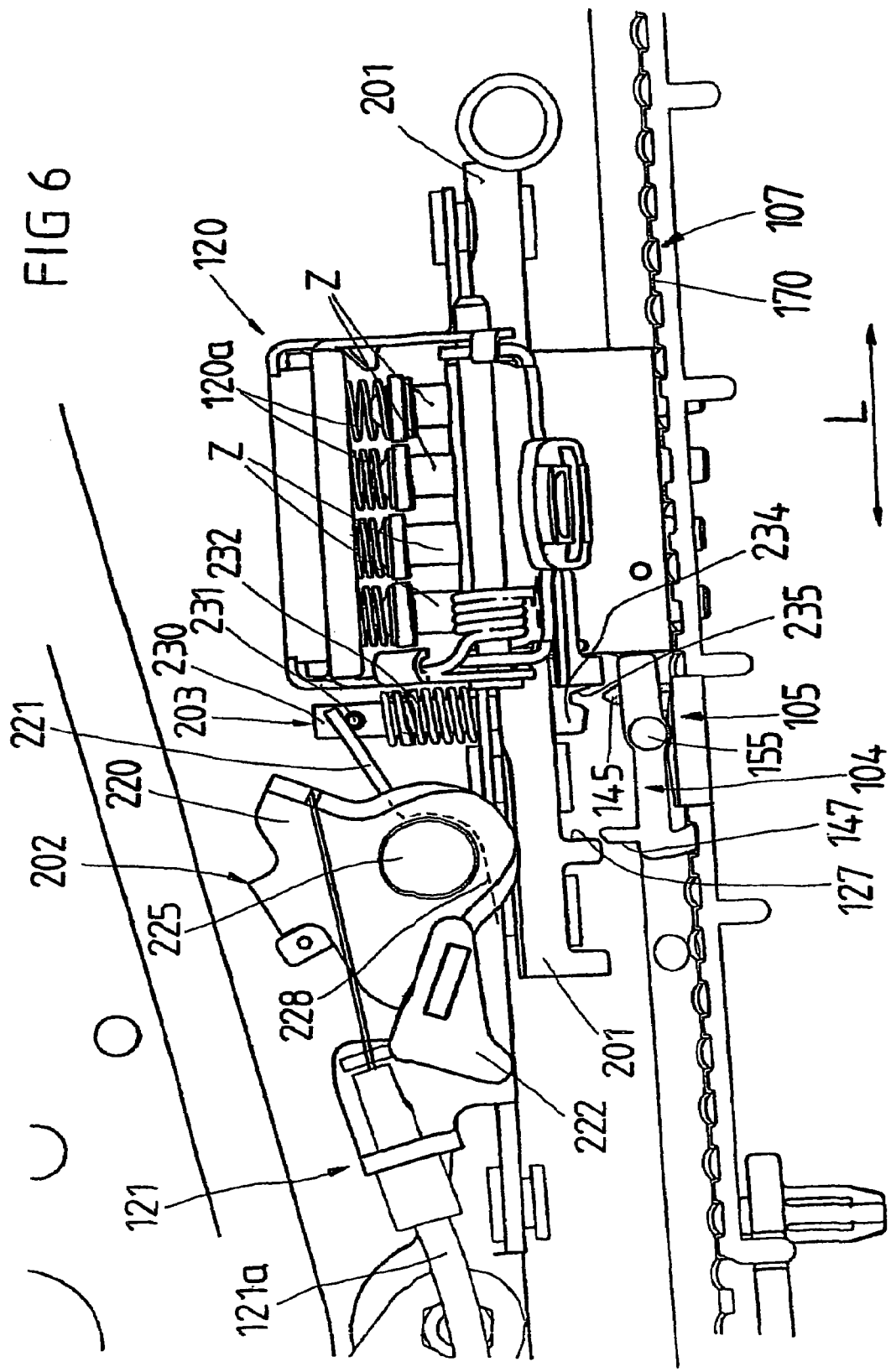

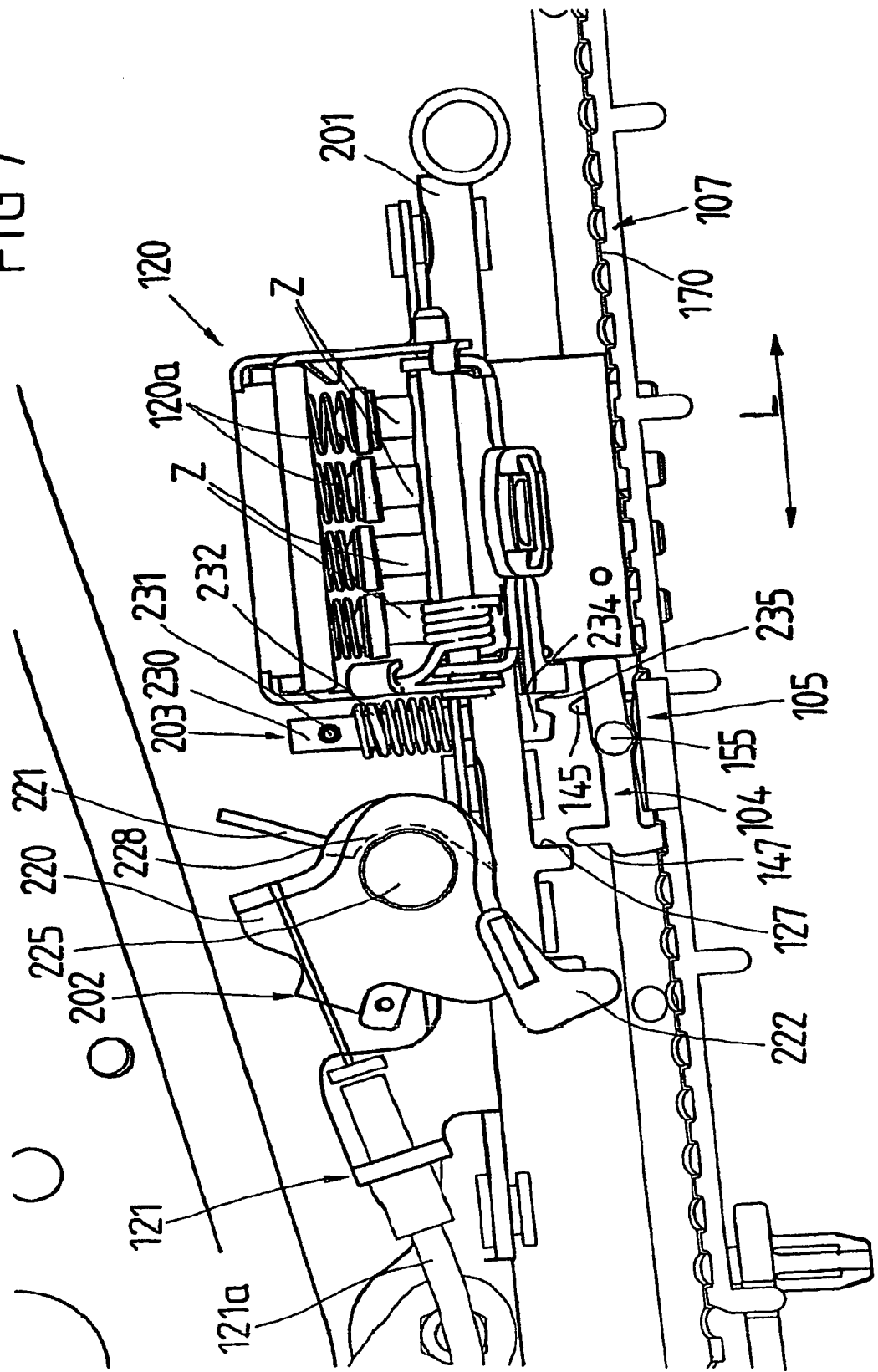

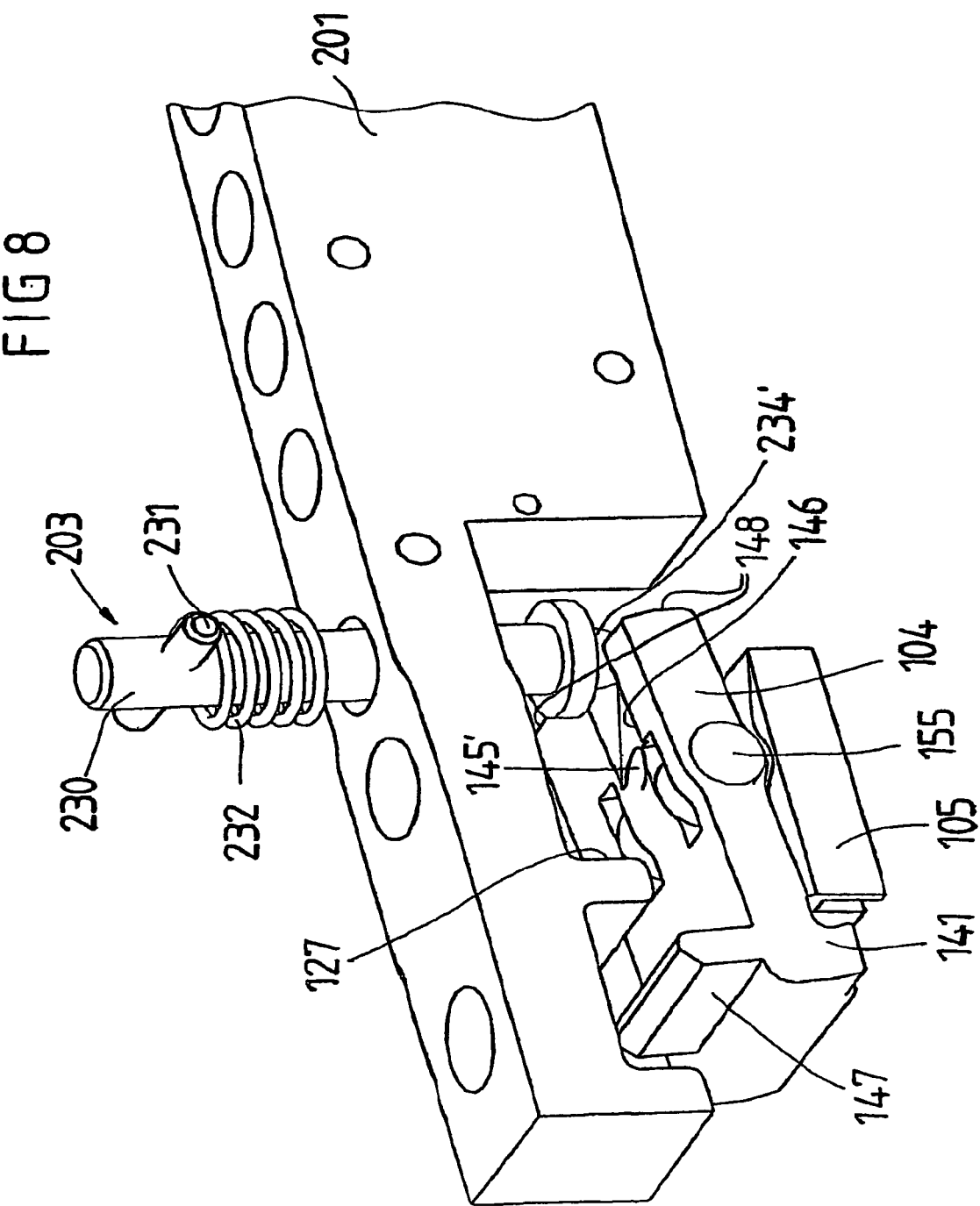

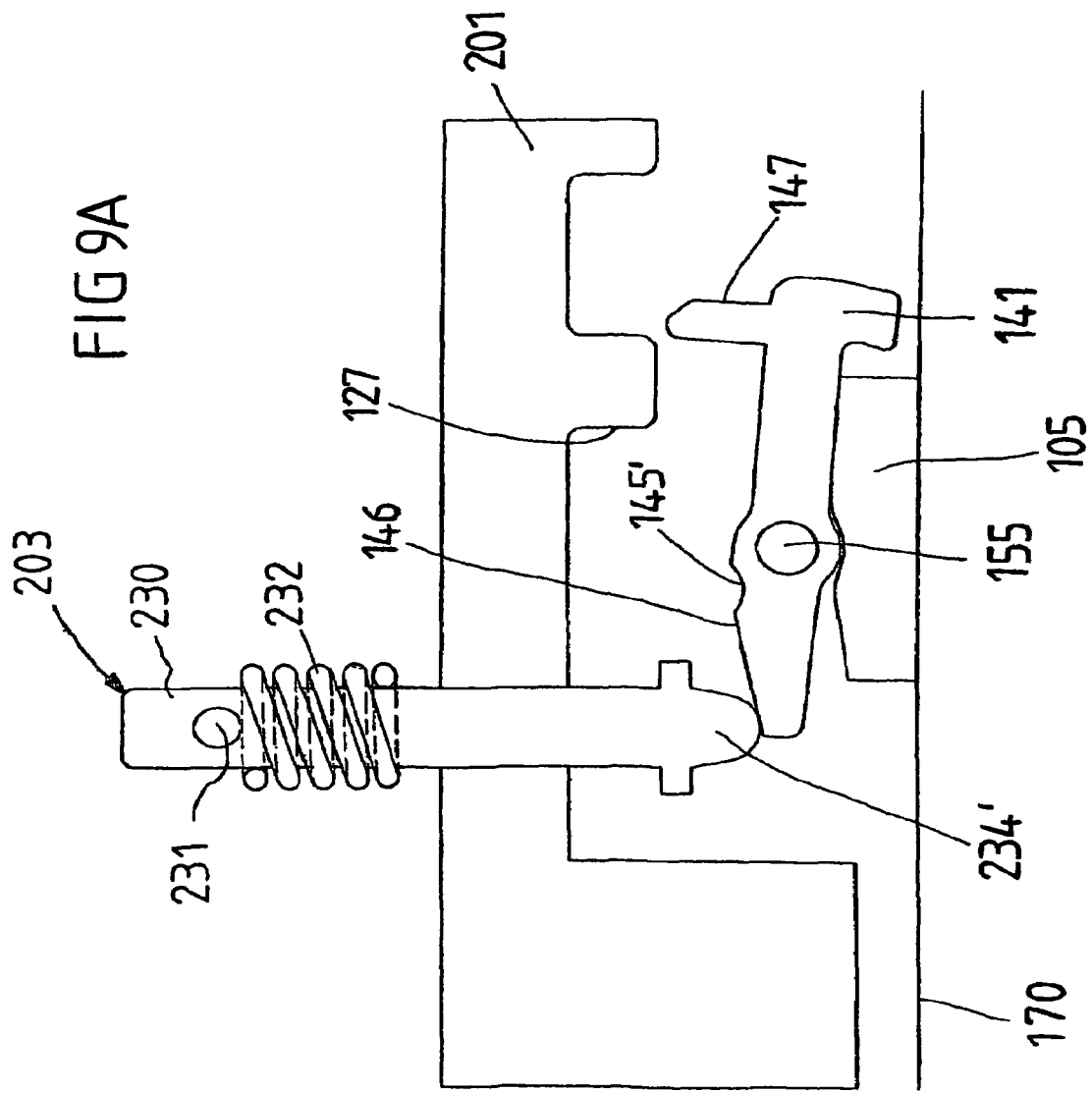

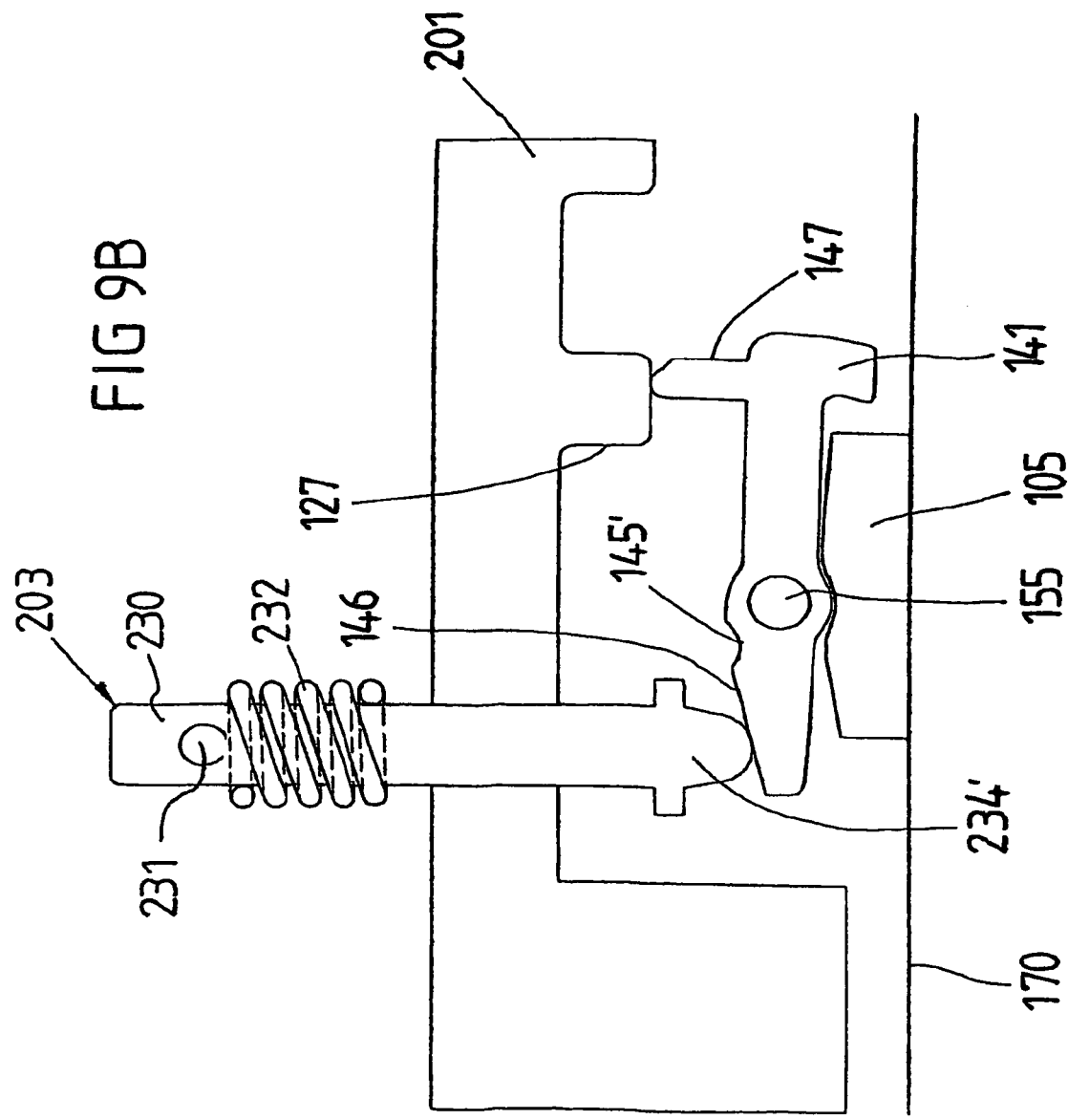

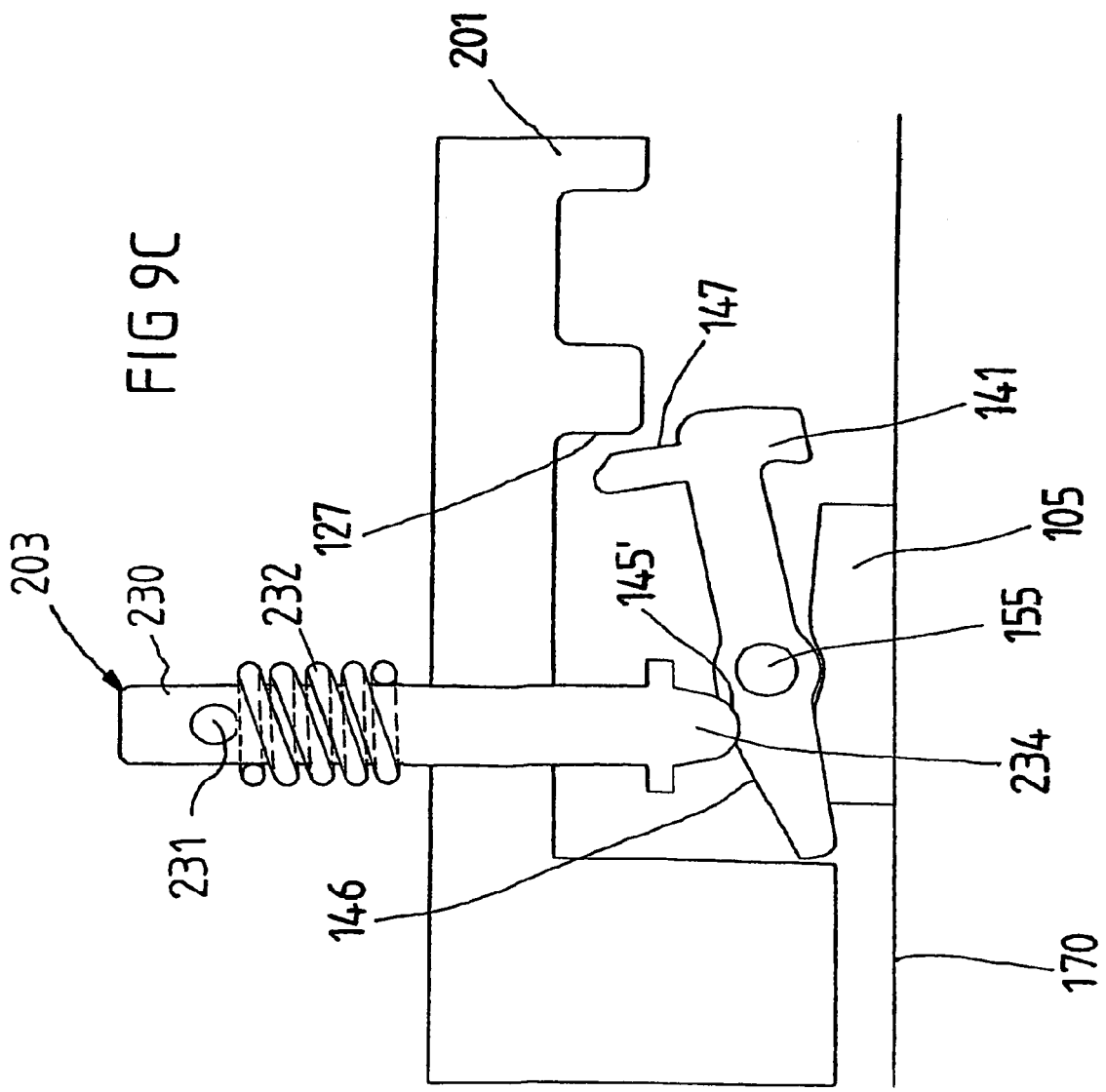

SEAT MODULE, A MOTOR VEHICLE SEAT, A MEMORY DEVICE FOR LONGITUDINAL RAIL GUIDE FOR A MOTOR VEHICLE SEAT

CROSS-REFERENCE TO A RELATED APPLICATION

This application is a National Phase Patent Application of International Application Number PCT/DE2004/001935, filed on Aug. 27, 2004, which claims priority of German Utility Model Number 203 14 237.3, filed on Sep. 9, 2003.

BACKGROUND

The invention relates to a memory device for a rail longitudinal guide for a motor vehicle seat.

A memory device of this kind is provided for use in a rail longitudinal guide which has two longitudinally extended guide rails which are displaceable relative to each other in the extension direction in order to be able to adjust the longitudinal seat position of a motor vehicle seat. For this one of the two guide rails is mounted fixed on the body on the vehicle floor of a motor vehicle and the second guide rail which is displaceable relative thereto serves as the seat rail for holding a motor vehicle seat. By moving the second rail relative to the first rail which is fixed on the bodywork it is thus possible to set the longitudinal seat position of a motor vehicle seat mounted on the second guide rail in the rail longitudinal direction. Rail longitudinal guides of this kind are normally mounted in pairs on the two longitudinal sides of a motor vehicle seat.

In order to be able to find again the previous seat longitudinal position as quickly as possible and without difficulty after a change in the longitudinal position of a motor vehicle seat it is known to equip the rail longitudinal guide with a memory device by which certain seat longitudinal positions can be stored as so-called memory positions. For this the memory device comprises a first memory module which is mounted displaceable on one of the two guide rails, more particularly the guide rail fixed on the bodywork, along the extension direction thereof in order to be able to set a specific memory position by moving the first memory module. Furthermore a locking device is provided on the first memory module for locking a previously set memory position. This first memory module on the one guide rail is assigned a second memory module on the other second guide rail (more particularly the seat rail) which is mounted locally fixed there—relative to the rail longitudinal direction—and has a stop which on reaching a seat longitudinal position of the second guide rail corresponding to the memory position enters into engagement with a counter stop of the first memory module.

In other words, a movement of the first memory module along a first of the two guide rails (namely the guide rail fixed on the bodywork) permits a choice of a certain memory position which is fixable by a locking device of the first memory module. This memory position corresponds to a certain seat longitudinal position, i.e. a certain position of the two guide rails relative to each other (in the rail longitudinal direction); and this memory position can be found in that a second memory module provided on the second guide rail (seat rail) has a stop which on reaching the memory position enters into engagement with the associated counter stop of the first memory module.

An important useful field for memory devices of this kind are motor vehicle seats having a so-called easy-entry function (climb-in aid). Motor vehicle seats with easy entry function can be moved forwards from an actual set seat longitudinal position with the backrest folded forwards in order to facilitate entry into the corresponding vehicle behind the vehicle seat which has been pushed forwards. Equipping a vehicle seat with an easy entry function is standard in front seats of two-door motor vehicles.

The memory device serves in the case of a motor vehicle seat having easy-entry function to immediately find without problem when sliding back the vehicle seat the seat longitudinal position previously set before moving the vehicle seat forwards with backrest folded forwards which can be for example the preferred seat longitudinal position of the driver.

A motor vehicle seat of this kind known from German Patent Application No. 101 27 152 A1 comprises a seat frame a backrest which is mounted for pivotal movement on the seat frame and which can be folded forwards from its useful position in the direction of a seat surface of the seat frame, a rail longitudinal guide with which the seat frame can be moved to adjust the seat longitudinal position in the seat longitudinal direction, a fixing device for locking the seat frame in a previously set seat longitudinal position, an actuating element for releasing the fixing device so that the seat frame can be moved in the seat longitudinal direction, a coupling mechanism which acts on the actuating element and which unlocks the fixing device when the backrest is folded forwards towards the seat surface, a memory device by which the seat frame during movement in the seat longitudinal direction can be stopped automatically in an adjustable seat longitudinal position defined as the memory position, a locking device of the memory device for locking a set memory position as well as means through which the locking device is coupled to the backrest.

By coupling the locking device of the memory device to the backrest it is to be achieved that when moving the vehicle seat with the backrest raised up into a new seat longitudinal position a new memory position can also be set whereas during sliding the vehicle seat with the backrest folded forwards which serves to execute a so-called easy entry function the previous memory position is to remain for a rapid return.

The object of the present invention is to improve a memory device for a motor vehicle seat of the type mentioned at the beginning.

BRIEF DESCRIPTION

According to this the second memory module has a base body made of plastics (preferably in the form of a plastics housing) through which it is fixed on the second guide rail.

The solution according to the invention is based on the knowledge that despite the considerable forces which can occur on the second module of the memory device when moving up to a memory position the formation of the base body of the second memory module of plastics is nevertheless possible if the second memory module has a suitable configuration such as will be apparent below when explaining the dependent claims.

The solution according to the invention has the advantage that the second memory module consists of a lightweight material (plastics) which is particularly easy to handle and shape. The base body consisting of plastics thereby forms the basis of the second memory module of the memory device insofar as the fixing of this module takes place on the associated second guide rail of the rail longitudinal guide through this base body.

The base body of the second memory module thereby has actuating elements and/or actuating faces for acting on the locking device of the first memory module.

Thus the base body can have a guide for an actuating element, more particularly in the form of a follower, provided for actuating the locking device of the second module. This actuating element can more particularly form a constituent part of a coupling device through which the locking device of the first memory module is coupled in the manner described above to the backrest of a motor vehicle seat.

The guide is preferably moulded in one piece on the base body and is formed by way of example through a full-length opening in the base body which extends in the guide direction of the corresponding actuating element. Furthermore the guide can have a hollow cavity for holding an elastic element, more particularly in the form of a coil spring which exerts a pretension on the movable (displaceable) actuating element mounted in or on the guide.

The base body preferably has at least one guide face along which an element of the locking device of the first memory module slides when moving up to the memory position with the backrest raised up, e.g. to prevent premature release of the locking device through the actuating element of the second memory module provided for this purpose.

The base body of the second memory module consisting of plastics is preferably designed for a positive locking fixing on the second guide rail of the rail longitudinal guide. For this the base body can have integral moulded positive locking elements (detent means) which are formed by at least one expanding snap element which after engaging in an associated detent opening of the second guide rail (optionally by using a locking pin) is spread out so that a positive locking and where necessary also force-locking snap fit connection is produced. As an alternative or in addition it is also possible to produce a connection of the base body with the associated second guide rail of the rail longitudinal guide through separate fixing means which are not moulded on the base body, e.g. through a rivet or screw connection.

The stop of the second memory module which on reaching the memory position moves into engagement with the associated counter stop of the first memory module is formed through a separate component part made from a solid material, namely metal (more particularly sheet metal) which is connected to the base body of the second memory module which is made from plastics. The connection is preferably through a positive and/or force locking engagement over a wide surface area.

The memory device can be combined with a fixing device, which serves to lock the two guide rails in a previously set seat longitudinal position, into one seat module which is mounted on a rail longitudinal guide of a motor vehicle seat and can thereby be combined into one installation module, as will be explained in further detail below.

The fixing device comprises movably mounted locking elements, more particularly in the form of locking teeth which to lock the rail longitudinal guide in a previously set seat longitudinal position can be brought into a locking position in which they engage in associated detent sites. The locking elements are thereby normally elastically pretensioned in the direction of their locking position so that the vehicle seat is automatically stopped in each relevant seat longitudinal position when the locking elements are not actively lifted from the associated detent sites (e.g. by folding the backrest forwards or by actuating an actuating lever which is hereby provided).

The fixing device is preferably mounted on the longitudinally movable second guide rail which is designed as the seat rail, whilst the associated detent sites are provided on the first rail which is fixed on the bodywork or run in a separate detent rail alongside same.

In order to support the locking elements according to a particularly preferred embodiment of the present invention the locking elements are mounted movable on at least one bearing plate. This bearing plate replaces the usual cast bodies hitherto used for supporting the locking elements.

At least one of the bearing plates can furthermore serve in addition to guide the actuating element which is mounted movable on the base body of the memory device, e.g. by forming a guide opening in the form of a passage on the corresponding bearing plate. The guide of the actuating element is hereby additionally stabilised since it is no longer solely provided by the plastics base body.

If locking teeth are used as locking elements which are movable along their extension direction in order to be able to lock or release the two guide rails then for their bearing are particularly suitable two sheet metal guide plates spaced from one another in the displacement direction and each having guide openings for the locking elements.

The second module of the memory device designed according to the invention on the one hand and the fixing device on the other are preferably mounted relative to each other so that at least one bearing plate of the fixing device supports the component part of the second memory module forming the stop so that on moving up to the memory position forces appearing on the stop are not diverted into the plastics base body of the second memory module but rather into that bearing plate. Since the bearing plates of the fixing device are in turn fixed on one of the guide rails then the forces appearing on moving up to the memory position are ultimately absorbed by the guide rails themselves which for reasons of crash security are designed extremely stable and can therefore readily compensate the corresponding forces.

For a particularly effective further direction of the forces occurring on reaching the memory position from the corresponding bearing into the associated guide rails, support areas are provided on the bearing plate through which the bearing plate is supported on the guide rail, namely additionally to the fixing points between the guide rail and bearing plate.

One of the bearing plates of the fixing device thereby also holds the actuating means which serve to actuate the locking elements of the fixing device (against the action of the elastic pretension).

A motor vehicle seat with easy entry function and memory device according to the invention is characterised by the features of claim 32.

BRIEF DESCRIPTION OF THE DRAWINGS

Further features and advantages of the invention will now be explained with reference to the following description of an embodiment illustrated in the drawings.

FIG. 1A is a first perspective view of an installation module for a rail longitudinal guide of a motor vehicle seat which comprises a memory module as well as a fixing device for the rail longitudinal guide.

FIG. 1B is a second perspective view of an installation module for a rail longitudinal guide of a motor vehicle seat which comprises a memory module as well as a fixing device for the rail longitudinal guide.

FIG. 2A is a first perspective view of the memory module of the installation module of FIGS. 1A and 1B.

FIG. 2B is a second perspective view of the memory module of the installation module of FIGS. 1A and 1B.

FIG. 3A shows individual parts of the memory module of FIGS. 2A and 2B.

FIG. 3B shows further individual parts of the memory module of FIGS. 2A and 2B.

FIG. 4A shows the fixing device of the installation module of FIGS. 1A and 1B fixed on a guide rail of a motor vehicle seat.

FIG. 4B shows the fixing device of the installation module of FIGS. 1A and 1B fixed on a guide rail of a motor vehicle seat.

FIG. 5A is a perspective view of parts of a seat frame with a rail longitudinal guide, with a fixing device of the rail longitudinal guide as well as with a programmable memory device for automatically seeking a predetermined seat longitudinal position, in a situation in which the backrest of the corresponding seat is located in its useful position.

FIG. 5B is a view according to FIG. 5A in which the rails of the rail longitudinal guide are not shown.

FIG. 6 is a view according to FIG. 5B in which the backrest of the seat has been folded forwards slightly from its useful position.

FIG. 7 is a further illustration according to FIG. 5B in which the backrest of the seat has been folded forwards onto the associated seat surface.

FIG. 8 is a detailed view of a modification of the memory device of FIGS. 4A to 7.

FIG. 9A shows the memory device of FIG. 8 in a first phase on approaching the memory position for a seat whose backrest is located in its useful position.

FIG. 9B shows the memory device of FIG. 8 in a second phase on approaching the memory position for a seat whose backrest is located in its useful position.

FIG. 9C shows the memory device of FIG. 8 in a third phase on approaching the memory position for a seat whose backrest is located in its useful position.

DETAILED DESCRIPTION

Figure 10:
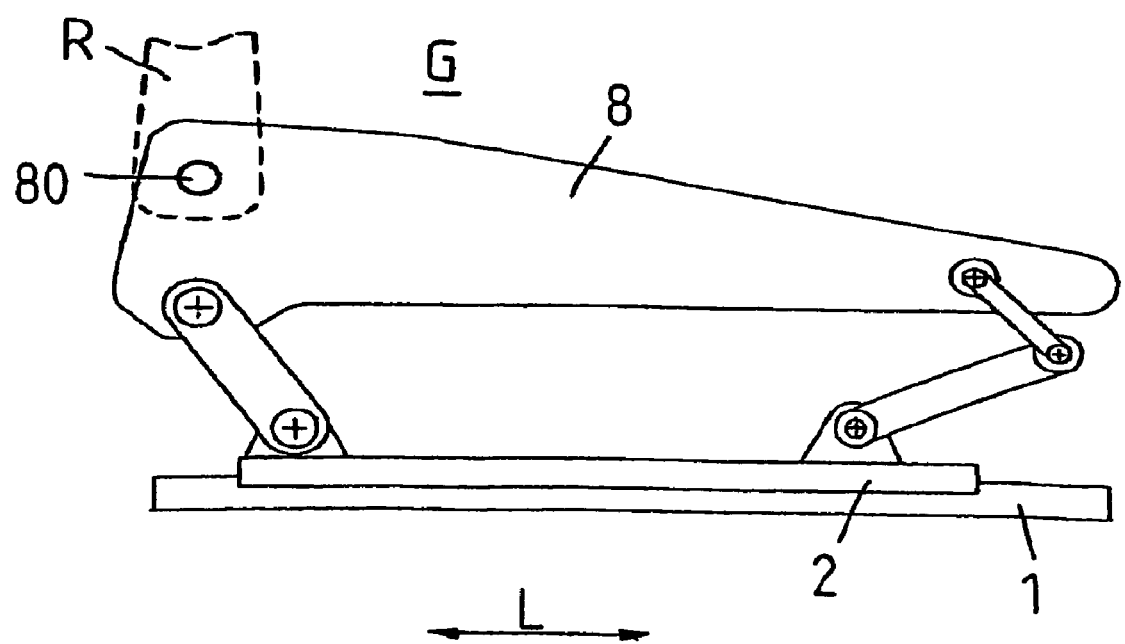
FIG. 10 is a diagrammatic view of a seat frame.

The seat frame (seat lower frame) illustrated in side view in FIG. 10 comprises a seat rail 2 which is supported movable in the seat longitudinal direction L on a lower rail 1 (body-fixed) which is to be fixed on the vehicle body, and a seat side part 8 which is attached vertically adjustable on the seat rail 2 through front and rear articulated levers. The seat frame G has a corresponding arrangement on its other longitudinal side which can be seen in FIG. 10. Between the two seat side parts of the seat frame G extends a seat surface which holds a seat cushion on which a vehicle occupant can sit.

Furthermore the side parts 8 of the seat frame G each have a bearing point 80 for swivel mounting a backrest R which is shown in dotted lines in FIG. 10.

Here parts of the seat frame is to mean all those component parts which are movable in the seat longitudinal direction on the body-fixed lower rail 1, thus in particular the seat rail 2, the seat side part 8 as well as the further component parts of the seat connected thereto.

If a vehicle seat of this kind adjustable in the longitudinal direction L is used for a two-door vehicle then it is known in order to facilitate entry into the back of the vehicle to couple the backrest to the seat longitudinal adjuster, namely so that when the backrest R is folded forwards towards the seat surface extending between the seat side parts 8 a fixing device associated with the rail longitudinal guide 1, 2 is released and the seat can be pushed forwards with the backrest folded forwards. This can be a so-called easy-entry function (entry aid).

In the following, first the basic principle of the easy-entry function including a programmable memory-device for automatically seeking a predeterminable seat longitudinal position will be explained with reference to a seat arrangement illustrated in FIGS. 5A to 10 and known from German Patent Application Publication No. DE 101 27 152 A1. For further details on this reference is made to the German Patent Application Publication No. DE 101 27 152 A1 as well as to International Patent Application Publication No. WO 00/55 002 A which in this respect are made the subject of the present description.

Essential characteristic features of the arrangement illustrated in FIGS. 5A to 7 lie inter alia in the design of the follower and an associated locking element which enable an automatic new adjustment of the memory position when the vehicle seat is moved with the backrest raised up (backrest in useful position) and which prevent a new adjustment of the memory position when the vehicle seat is moved to execute the easy-entry function with the backrest folded forwards onto the seat surface. These two function groups will be described in further detail below with reference to FIGS. 5A to 7.

FIG. 5A shows in a perspective view a rail longitudinal guide formed from two guide rails 101, 102, comprising a lower rail 101 to be mounted fixed on the body as well as an upper rail 102 which supports the seat frame. This longitudinal guide 101, 102 enables an adjustment of the seat longitudinal position (position of the seat frame in the seat longitudinal direction L).

To lock a previously set seat longitudinal position a fixing device 120 is provided with elastically pretensioned locking teeth Z which is mounted on the seat-side upper rail 102 (seat rail) and whose locking teeth Z can engage in associated detent openings in the body-fixed lower rail in order to lock the two rails 101, 102. Through the elastic pretension of the locking teeth Z in the direction of the associated detent openings, the fixing device 120 has the tendency to lock the two rails 101, 102 with one another provided this is not released through action on an actuating element 120b provided for this purpose (see DE 101 27 152 A1). This action can—as shown in detail in DE 101 27 152 A1—occur on the one hand through direct unlocking of the fixing device through a suitable actuating lever or indirectly through folding the backrest forwards to trigger the easy-entry function.

Furthermore FIG. 5A and more particularly FIG. 5B which does not show the rails 101, 102, show the essential component parts of a memory device 104, 105, 107, namely a slider 105, a locking pawl 104 mounted for pivotal movement on the slider 105, as well as a detent rail 107 provided with detent openings 170 in which a detent hook 141 of the locking pawl 104 can engage to lock a previously set memory position. Also in this respect reference is made to DE 101 27 152 A1 for further details.

FIGS. 5A and 5B show a section of the seat frame in a state in which the seat is locked in a memory position with the backrest raised up (in its useful position) by the fixing device 120.

In this state an actuating element in the form of a follower 203 acts on the locking pawl 104 of the memory device so that the locking pawl 104 is lifted with its detent hook 141 out from the detent rail 107. The follower 203 is mounted longitudinally displaceable on the seat rail 102 or on a retaining part 201 fixed on the seat rail 102 and comprises a longitudinally extended base body 230 whose lower end facing the locking pawl 104 is designed or fitted with an entrainment element 234 which is provided with an entrainment opening 235. This follower 203 is pretensioned by an elastic element 232 in the form of a compression spring (resetting spring) which is supported on one side on the holding part 201 and on the other on a projection 231 protruding from the base body 230 of the follower 203, in a direction away from the locking pawl 104 so that it has the tendency to lift away from the locking pawl 104. This is however prevented by a locking element 221 on the base body 220 of a lever 202 mounted for pivotal movement about an axis 225 which is pretensioned by a spring element 228 in the form of a torsion spring in the direction of the projection 231 of the follower 203 so that the locking element 221 presses the follower against the locking pawl against the action of the elastic element 232 provided on the follower so that the detent hook 141 of the locking pawl 104 is lifted out from the detent rail 107. A projection 145 of the locking pawl 104 thereby engages at the same time in the entrainment opening 235 of the follower 203.

This is achieved in that the locking element 221 pretensioned by the torsion spring 228 exerts on the follower 203 a force in the direction of the locking pawl 204 which is greater than the force acting in the opposite direction as a result of the compression spring 232. Thus the detent hook 141 is lifted out from the detent openings 170 of the detent rail 107 and the locking pawl 104 can during displacement of the seat with the backrest raised up be entrained in the seat longitudinal direction L so that the memory position is at the same time re-set during displacement of the seat.

If in the position of the seat illustrated in FIGS. 5A and 5B the backrest is folded forwards towards the seat surface then this tensions the core 121*a* of a Bowden cable 121*a*, 121*b* which is connected by one end to the seat back and by the other end to the base body 220 of the pivotally mounted lever 202. The lever 202 is hereby pivoted so that the locking element 221 is lifted from the projection 231 of the follower 203 and thus the follower is lifted under the action of the compression spring 232 from the locking pawi 104. Since the locking pawi 104—as explained for example in DE 101 27 152 A1—is under pretension by a spring element so that the detent hook 141 of the locking pawl 104 has the tendency to engage in one of the detent openings 170 of the detent rail 107, the locking pawl 104 is locked in its actual position. This corresponding to a locking of the memory device 104, 105, 107, overall. This situation is shown in FIG. 6.

The mechanism is designed so that the locking of the memory device 104, 105, 107 takes place when folding the backrest from a vertical useful position about roughly 20 to 40°. The locking of the memory device thus takes place already in the first stage (phase) of activation of the easy-entry mechanism by folding forward the backrest towards the seat surface. The fixing device 120 is locked as before in this first phase of folding the backrest forwards, so that no displacement of the seat in the longitudinal direction L can take place.

This is only possible on folding the backrest further forward whereby according to FIG. 7 a fixing section 222 provided on the pivotally mounted lever 202 acts on an actuating lever 109 of the fixing device 120 so that the fixing device 120 is released. This then enables a displacement of the seat in the longitudinal direction L.

Accordingly a displacement of the seat in the longitudinal direction L on folding the backrest forwards to execute the easy entry function is only possible after the locking pawl 104 of the memory device 104, 105 107 has been locked. Thus the memory position which exists on folding the backrest forwards is reliably fixed before a displacement of the seat with the backrest folded forwards can take place. This memory position can then be found again when subsequently moving the seat back, as is explained in DE 101 27 152 A1. It is thereby prevented that when executing the easy-entry function a displacement of the seat with the backrest folded forwards can take place before the starting position of the seat is fixed as the memory position.

The overall assembly is thereby very compact owing to the ability of the follower 203 to move substantially perpendicular to the extension direction L of the rail longitudinal guide as well as owing to the pivotal bearing of the lever 202 with the locking element 221 and is located substantially in the space surrounded by the rails 101, 102 of the rail longitudinal guide or only projects upwards beyond this.

If according to FIGS. 5A to 7 the backrest of the seat is folded forwards in order to trigger the easy entry function then the problem can occur that the detent hook 141 of the locking pawl 104 cannot engage in one of the detent openings 170 of the detent rail 107. Then the fixing device 120 enables as a rule a stepless adjustment of the seat longitudinal position, comparable roughly with the fixing device described in DE 299 1'0 710 U1 whilst here for the locking of the memory position a finely graded (thus not stepless) detent locking is provided (by using the detent rail 107 with the detent openings 170). The situation can thus arise where on folding the backrest forwards the detent hook 141 of the locking pawi 104 cannot engage in a detent opening 170 but stands up on its edge. Initially no locking of the memory position is then possible.

If now with the backrest folded forwards the seat frame and thus also the seat rail 102 are moved forwards from the memory position in the seat longitudinal direction (easy entry) then the locking pawl 104 is hereby entrained with the slider 105 by a certain amount since a stop 127 provided on the seat rail 102 acts on an associated stop 147 on the locking pawl side. The locking pawl 104 and the slider 105 are thereby only entrained so far until the detent hook 141 of the locking pawl 104 can engage under the action of the spring element provided on the locking pawl completely into the next detent opening 170 of the detent rail 107. The locking pawl 104 and thus the locking device 104, 107 of the memory device 104, 105, 107 overall are then locked in that memory position which lies closest to the seat longitudinal position in which the fixing device 120 was locked prior to folding the backrest forwards.

In the locking state in which the detent hook 141 of the locking pawl 104 engages in a detent opening 170 of the detent rail 107 the stop 147 on the locking pawl side is located underneath the stop 127 on the seat rail side so that these stops 127, 147 can no longer enter into active connection with one another. The seat can then be moved further forwards in the seat longitudinal direction L whereby the locking pawl 104 and the slider 105 remain in the previously locked memory position.

FIG. 8 shows a modification of the embodiment according to the invention of FIGS. 5A to 7, namely looking at approaching the memory position when sliding the seat back with the backrest raised up, thus located in the useful position. This relates in particular to the case where the seat is moved back towards the memory position whilst a vehicle occupant is sitting on the seat.

If the seat is moved into the memory position with the backrest raised up after it had previously been moved from the memory position with the backrest folded forwards, thus without entrainment of the locking pawl 104 and the slider 105, then the follower 203 on reaching the memory position meets the locking pawl 104. The follower 203 is thereby owing to the backrest located in the useful position pressed down towards the locking pawl 104 of the memory device by the locking element 221 (not shown in FIG. 8).

In order to enable in this situation illustrated in FIG. 8 reaching the actual memory position in which the follower 203 engages positively in the locking pawl 104, the locking pawl 104 has a ramp 146 on which the lower end section 234' of the follower 203 can slide up to a trough 145' of the locking pawl 104. This is shown in FIGS. 9a to 9c whereby the follower 203 finally engages in the memory position with its lower end section 234' into the associated trough 145' of the locking pawl 104. The lower end section 234' of the follower 203 as well as the trough 145' of the locking pawl 104 then act as stops which enable entrainment of the locking pawl 104 together with the slider 105 during further displacement of the seat.

The ramp 146 thereby extends only over a part of the width of the locking pawl 104 (extension perpendicular to the seat longitudinal direction L and to the direction of movement of the follower 203) so that adjoining regions 148 of the locking pawl 104 can act as stops in order to define the memory position in the locked state of the locking pawl 104.

Since the follower 203 on moving up to the memory position with the backrest raised up and located in the useful position is pressed down towards the locking pawl 104, on arriving at the memory position it also at the same time lifts the detent hook 141 of the locking pawl 104 out from the associated detent rail 107. Only then is the common further displacement of the seat on the one side and of the locking pawl 104 and slider 105 on the other possible.

Through the interaction of the stop 127 on the seat frame side with the stop 147 on the locking pawl side on arriving at the memory position whereby the stop 147 of the locking device (locking pawl 104) on the locking pawl side is supported in the vertical device (parallel to the direction of movement of the follower 203) on the stop 127 on the seat frame side, whilst the follower 203 slides along the ramp 146, the lifting of the locking pawl 104 from the associated detent rail 107 is only possible after the stop 147 on the locking pawl side has passed the stop 127 on the seat frame side. The follower 203 then engages in a trough 145'. Since the stops 127, 147 at first prevent pivotal movement of the locking pawl 104 and the ramp 147 runs inclined in the seat longitudinal direction, the follower 203 on moving up the ramp 146 is first lifted. The resiliently mounted follower 203 (through the spring 232) hereby executes a compensating movement in the vertical direction.

To sum up, the embodiment of the invention illustrated in FIGS. 8 to 9C enables on approaching the memory position with the backrest raised up in the useful position an automatic entrainment of the parts 104, 105 of the memory device located in the memory position so that during adjustment of the seat with the backrest raised up an automatic resetting of the memory position can take place. If however the memory position is reached with the backrest folded forwards onto the seat then the follower 203 under the action of the compression spring 232 is located in a position in which it cannot act on the locking pawi 104 of the memory device 104, 105, 107. The locking pawl 104 thereby remains locked together with the slider 105 in the memory position in which the seat is then automatically stopped so that the previously set memory position has been found again—as desired—when sliding the seat back with the backrest folded forwards.

As can be seen in particular from FIG. 8 the follower 203 can only move up onto the locking pawl 104 through the ramp 146 since otherwise the follower 203 on reaching the memory position would jam with the locking pawl 104 and could not move up on same in order to release the locking device. In other words, the holding down member is lifted by the ramp (towards the trough 145').

A further development of the known arrangements explained above with reference to FIGS. 5A and 10 will now be described with reference to FIGS. 1A to 4B. The difference here between the arrangement to be explained with reference to FIGS. 1A to 4B and the seat frame illustrated in FIGS. 5A to 10 is particularly regarding the design of the fixing device 120 and regarding the design of a memory module 6 which is mounted on the seat rail 102 of the rail longitudinal guide 101, 102 which interacts with the memory device 104, 105, 107 of the type illustrated in FIGS. 5A to 9C. More explicit details will only be provided below of the new types of components of motor vehicle seat with easy entry function and memory device as previously described generally with reference to FIGS. 5A to 10. According to FIGS. 1A and 1B as well as 4A and 4B a fixing device 20 has for locking a rail longitudinal guide (of which only the seat rail 2 can be seen in FIGS. 4A and 4B) locking elements in the form of locking teeth 25 which are mounted longitudinally movable on two guide plates 21, 22, of the fixing device 20. The two guide plates 21, 22 are mounted spaced from each other along the direction of movement (displacement direction) of the locking teeth 25 and each have through openings as guide openings for the locking teeth 25.

Each of the locking teeth 25 is assigned an elastic element in the form of a coil spring 26 which is supported on one side on the relevant locking tooth 25 and on the other on the one guide plate 21 of the fixing device 20 so that the locking teeth 25 are held substantially rattle-free and are thereby pretensioned so that they engage in associated detent openings in order to lock the rail longitudinal guide (of which only the seat rail 2 can be seen in FIGS. 4A and 4B) in a previously set seat longitudinal position.

To actuate the locking teeth 25, i.e. in order to be able to move these from the locked state and thereby to enable a displacement of the two guide rails relative to each other into a new seat longitudinal position, an actuating lever 28 is provided which is mounted to pivot about an axis 28a running parallel to the rail longitudinal direction L and which is pretensioned by an elastic element in the form of a torsion spring 29 in the direction of a position in which the locking teeth 25 are not lifted out from their locking position. In other words, the torsion spring 29 also (through action on the actuating lever 28) assists the pretensioning of the locking teeth 26 into a position in which the fixing device locks the guide rails of the rail longitudinal guide in a previously set seat longitudinal position.

As can be seen from FIGS. 4A and 4B the two guide plates 21, 22 of the fixing device 20 are each mounted on the seat rail 2 and are connected to same. The one guide plate 21 hereby lies on the base surface 2c of the guide rail 2 of substantially U-shaped cross-section, and is connected to the seat rail 2 through a fixing point 21a formed by a passage in that the passage 21a has been introduced into a corresponding fixing opening of the seat rail 2 and then expanded so that it bears with force locking engagement against the edge of the associated fixing opening of the seat rail 2 and additionally engages over the edge thereof with positive locking action. Alternatively a fixing of the one bearing plate 21 on the associated seat rail 2 by rivets or screws is also possible.

The other guide plate 22 which is spaced along the extension or displacement direction of the locking teeth 25 from the first guide plate 21 extends from the one angled arm 2a to the other angled arm 2b of the U-shaped seat rail 2 and is supported there each time with side end sections 22a, 22b. The connection between the further guide plate 22 and the seat rail 2 is provided by laser welding on at least one side end section 22b of the corresponding guide plate 22.

A special feature of the fixing device described above with reference to FIGS. 1A and 1B as well as FIGS. 4A and 4B lies in the design of the bearing and guide device for the locking teeth 25 which is formed by two guide plates 21, 22 spaced from one another—as opposed to the known light cast metal housings for holding the locking teeth. The weight and costs of the fixing device can hereby be further reduced. The design of the locking teeth 25 and their tensioning in the direction of a locking position by suitable elastic elements 26, 29, as well as the use of a pivotal actuating lever 28 for moving the locking teeth 25 from the locking position into an unlocked state in which a displacement of the two guide rails of the rail longitudinal guide relative to each other is possible is known from the principle of DE 10127 152 A1.

The use of guide plates for the displaceable bearing of the locking teeth 25 of the fixing device 20 enables a new type of design of memory module associated with the seat rail 2 which interacts with the memory device 104, 105, 107 associated with the relevant rail 1 or 101 fixed on the body (see FIGS. 5A to 10), namely more particularly interacts with their movable components 104, 105 (more particularly the locking pawl 104), as already described above with reference to FIGS. 5A to 10.

In the following with reference to FIGS. 1A to 3B the movable components (locking device in the form of a locking pawl 104, slider 105) of the memory device 104, 105, 107 associated with the rail on fixed on the body are designated the first memory module whilst the elements mounted on the seat rail 2 and interacting therewith are designated the second memory module.

In the following with reference to FIGS. 1a to 3b the movable components (locking device in the form of a locking pawl 104, slider 105) of the memory device 104, 105, 107 associated with the rail on fixed on the body are designated the first memory module whilst the elements mounted on the seat rail 2 and interacting therewith are designated the second memory module.

The second memory module 6 has according to the invention a base body 60 made of plastics in the form of a plastics housing which is to be fixed by a snap-fitting element 65 onto the seat rail 2 of a rail longitudinal guide. The snap-fit element 65 preferably formed in one piece on the base body 60 is for this inserted in an associated fixing opening of the seat rail 2 and then spread out by a locking pin 66 so that it engages with positive connection behind the corresponding fixing opening and preferably bears with force locking engagement against the edge of the opening. Alternatively a rivet or other suitable fixing elements can also be used as connecting means.

A guide face 61 is formed on the base body 60 and (corresponding to the stop 127 of FIGS. 5B to 9C) can interact with an associated stop 147 of the locking pawl 104 of the first memory module 104, 105 on reaching the memory position with the backrest raised up.

Furthermore a guide 63 designed as a through opening is formed on the base body 60 for an actuating element 3 which is formed by a follower in the form of a bolt 30 with an actuating head 34 and which for acting on the locking pawl 104 of the first memory module 104, 105 can be actuated in dependence on the pivotal position of the backrest of the corresponding vehicle seat, as already described previously with reference to FIGS. 5A to 10.

The actuating element 3 can thereby also interact in a different way with the first memory module 104, 105, more particularly its locking pawl 104, see DE 101 27 151 A1, DE 101 27 153 A1 as well as DE 202 10 895 A1.

In connection with the present invention it is only of importance that the actuating element 3 is mounted on the plastics base body 60 of the second memory module 6 which in turn is fixed on the seat rail of a rail longitudinal guide, and that this actuating element 3 interacts with a first memory module 104, 105, more particularly its locking pawl 104 which is associated with the guide rail of a rail longitudinal guide fixed on the body.

A housing 64 is thereby moulded on the base body 60 which consists of plastics in which according to FIG. 1B an elastic element in the form of a coil spring is housed secured against loss by which the actuating element 3 is pretensioned in a certain direction, i.e. (depending on the useful purpose in each individual case) in the direction of the locking pawl 104 of the memory device in the direction away from the locking pawl 104 of the memory device.

The second memory module 6 furthermore has a stop 602 which on reaching the memory position moves into engagement with a counter stop of the first memory module 104, 105, in order to stop the seat frame on reaching the memory position. The corresponding counter stop can be formed by way of example through the locking pawl 104 of the first memory module.

Since on reaching the memory position large stop forces can act against the stop 602 of the second memory module this is formed on a separate component part 600 of spring metal plate which is fixed, more particularly locked positively, on the base body 60 made of plastics by a large surface area engagement 601, 604 with detent tabs 104.

The section (arm) of the sheet metal part 600 forming the stop 602 thereby extends along an angled section 62 of the base body 60 which is made of plastics, and a base surface 601 of the sheet metal part 600 has a through opening 603 which aligns with the through opening 63 of the plastics base body 60 serving to guide the actuating element 3.

The actuating element 3 is thereby not only guided in the through opening 63 of the base body 60 which is made from plastics, but additionally also in a passage 31a which is formed on an upper bearing plate 21 and which is engaged by the actuating element 3, see in particular FIG. 1B. The passage 21a serving to guide the actuating element 3 is thereby formed in the same way as the passages 21a serving to fix the one bearing plate 21 on the seat rail 2. Passages 21a of this kind can be easily formed on the bearing plate 21 in that a through opening is formed in the bearing plate 21 and a mandrel is drawn through same whose outer diameter is larger than the diameter of the through opening previously formed. A tubular section designated here as a passage 21a is hereby formed on the bearing plate 21 by displacing material from the edge of the previously formed through opening outwards by the drawing mandrel thereby forming a section (passage 21a) protruding tubular from the bearing plate 21.

The section of the sheet metal part 600 forming the stop 602 is furthermore supported on the second bearing plate 22 of the fixing device 20 so that on approaching the memory position forces acting on the stop 602 are immediately directed into the second bearing plate 22 and from here can be absorbed through the seat rail 2 via the supporting points 22a, 22b, see FIGS. 4A and 4B.

The invention claimed is:
1. A memory device for a rail longitudinal guide of a motor vehicle seat which has two longitudinally extended guide rails displaceable relative to each other in an extension direction for adjusting the seat longitudinal position, the memory device comprising:

a first memory module which is displaceable for adjusting a memory position along a first guide rail of the two guide rails in the extension direction thereof and which has a locking device for locking a set memory position; and a second memory module comprising:
   a component forming a stop, wherein the stop upon reaching a relative position of the two guide rails corresponding to the set memory position engages with a counter stop of the first memory module;
   a plastic base body fixedly mounting the second memory module on the second guide rail;
   a fixing device comprising at least one bearing plate and locking elements configured to lock the two guide rails, wherein the locking elements are mounted on the at least one bearing plate; and
   wherein the bearing plate supports the component forming the stop such that forces exerted on the stop are substantially diverted into the bearing plate.

2. The memory device according to claim 1, wherein the base body has one of at least one actuating element and at least one actuating surface for actuating the locking device of the first memory module.

3. The memory device according to claim 2, wherein the base body has a guide for an actuating element provided for action on the locking device.

4. The memory device according to claim 3, wherein the guide is formed integral on the base body.

5. The memory device according to claim 4, wherein the guide is in the form of a through opening which extends in a guide direction of the actuating element.

6. The memory device according to claim 3, wherein the guide has a hollow cavity for holding an elastic element.

7. The memory device according to claim 6, wherein the elastic element acts under pretension on the actuating element.

8. The memory device according to claim 6, wherein the elastic element is a coil spring.

9. The memory device according to claim 3, wherein an actuating element for actuating the locking device of the first memory module is mounted movable in the guide.

10. The memory device according to claim 3, wherein the stop of the second memory module is formed by a separate component part connected to the base body, and wherein the separate component has a through opening for the actuating element.

11. The memory device according to claim 1, wherein the base body has a guide face along which a section of the locking device slides on moving up to the memory position of the guide rails of the rail longitudinal guide.

12. The memory device according to claim 11, wherein an unlocking of the locking device by the actuating element before reaching the memory position is prevented by the guide face.

13. The memory device according to claim 1, wherein the base body is configured to be positively fixed on the second guide rail.

14. The memory device according to claim 13, wherein the base body has for fixing on the second guide rail at least one integral moulded positive locking element.

15. The memory device according to claim 13, wherein for positive fixing of the base body on the second guide rail there is at least one detent element.

16. The memory device according to claim 15, wherein the detent element is configured to be an expandable snap fitting element which is expandable by a locking pin.

17. The memory device according to claim 1, wherein the base body has at least one fixing point through which the base body is fixable by separate fixing means comprising any one of at least one rivet and at least one screw on the second guide rail.

18. The memory device according to claim 1, wherein the stop of the second memory module is formed by a separate component part connected to the base body.

19. The memory device according to claim 18, wherein the separate component part is made of metal.

20. The memory device according to claim 18, wherein the separate component part is connected with keyed engagement to the base body.

21. The memory device according to claim 18, wherein the separate component part is connected to the base body through a flanged engagement.

22. A seat module for a rail longitudinal guide of a motor vehicle seat which has two longitudinally extended guide rails displaceable relative to each other in an extension direction for adjusting the seat longitudinal position, the seat module comprising:
   a memory device comprising:
      a first memory module which is displaceable for adjusting a memory position along a first of the two guide rails in the extension direction thereof and which has a locking device for locking a set memory position, and
      a second memory module which is mounted on a second of the two guide rails and which has a component forming a stop, wherein the stop upon reaching a relative position of the two guide rails corresponding to the set memory position engages with a counter stop of the first memory module,
      wherein the second memory module comprises a plastic base body through which the second memory module is fixed on the second guide rail,
      the second memory module further comprising a fixing device comprising movably mounted locking elements configured to lock the two guide rails in a number of different positions and release the guide rails from the different locked positions for locking the seat longitudinal guide on one side and for releasing the rail longitudinal guide on the other, the fixing device comprising at least one bearing plate, wherein the locking elements are mounted on the at least one bearing plate; and
      wherein the bearing plate supports the component forming the stop such that forces exerted on the stop are substantially diverted into the bearing plate.

23. The seat module according to claim 22, wherein the fixing device is mounted on any one of the two guide rails.

24. The seat module according to claim 22, wherein the locking elements are movable through displacement and are formed as locking teeth.

25. The seat module according to claim 22, wherein the at least one bearing plate is designed as a guide plate for the locking elements.

26. The seat module according to claim 25, wherein the fixing device comprises two guide plates spaced from one another in the displacement direction of the locking elements.

27. The seat module according to claim 25, wherein the at least one guide plate has guide openings for the locking elements.

28. The seat module according to claim 22, wherein the at least one bearing plate is fixed on any one of the guide rails.

29. The seat module according to claim 22, wherein the stop of the second memory module is formed by a separate component part connected to the base body, and wherein the component part forming the stop of the second memory module is supported on at least one bearing plate.

30. The seat module according to claim 22, wherein actuating means for the locking elements are mounted on the at least one bearing plate.

31. The seat module according to claim 22, wherein the at least one bearing plate is supported on any one of the guide rails.

32. A seat module for a rail longitudinal guide of a motor vehicle seat which has two longitudinally extended guide rails displaceable relative to each other in an extension direction for setting the seat longitudinal position, the seat module comprising:
- a memory device comprising:
- a first memory module which is displaceable for adjusting a memory position along a first of the two guide rails in the extension direction thereof and which has a locking device for locking a set memory position, and
- a second memory module which is mounted on a second of the two guide rails and which has a component forming a stop, wherein the stop upon reaching a relative position of the two guide rails corresponding to the set memory position enters into engagement with a counter stop of the first memory module,
- wherein the second memory module comprises:
    - a plastics base body through which the second memory module is fixed on the second guide rail, and
    - a fixing device for locking the two guide rails in a number of different seat longitudinal positions, the fixing device having movably mounted locking elements which can be brought into different positions for locking the seat longitudinal guide on one side and for releasing the rail longitudinal guide on the other,
    - wherein the base body has one of at least one actuating element and at least one actuating surface for actuating the locking device of the first memory module,
    - wherein the base body has a guide for an actuating element provided for action on the locking device,
    - wherein the fixing device comprises at least one bearing plate having a guide in the form of a guide opening for the actuating element, wherein the locking elements are mounted on the at least one bearing plate, and
    - wherein the bearing plate supports the component forming the stop such that forces exerted on the stop are substantially diverted into the bearing plate.

33. A motor vehicle seat comprising:
- a seat frame,
- a back rest which is mounted for pivotal movement on the seat frame and is foldable forwards from its useful position towards a seat surface of the seat frame,
- a rail longitudinal guide with which the seat frame is movable to set a seat longitudinal position in a rail longitudinal direction, the rail longitudinal guide having two longitudinally extended guide rails displaceable relative to each other in the rail longitudinal direction;
- a memory device for adjusting the longitudinal position of the seat frame, the memory device comprising:
- a first memory module which is displaceable for adjusting a memory position along a first guide rail of the two guide rails in the rail longitudinal direction and which has a locking device for locking a set memory position; and
- a second memory module comprising:
    - a component forming a stop, wherein the stop upon reaching a relative position of the two guide rails corresponding to the set memory position engages with a counter stop of the first memory module;
    - a plastic base body fixedly mounting the second memory module on the second guide rail;
    - a fixing device comprising at least one bearing plate and locking elements configured to lock the two guide rails, wherein the locking elements are mounted on the at least one bearing plate;
    - wherein the bearing plate supports the component forming the stop such that forces exerted on the stop are substantially diverted into the bearing plate,
- wherein the fixing device is coupled to the backrest with a fixing device coupling mechanism so that the fixing device is released on folding the backrest towards the seat surface; and
- wherein the locking device is coupled to the backrest with a locking device coupling mechanism.

* * * * *

UNITED STATES PATENT AND TRADEMARK OFFICE
CERTIFICATE OF CORRECTION

| | | |
|---|---|---|
| PATENT NO. | : 7,600,816 B2 | Page 1 of 1 |
| APPLICATION NO. | : 10/571205 | |
| DATED | : October 13, 2009 | |
| INVENTOR(S) | : Bauersachs et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 671 days.

Signed and Sealed this

Fifth Day of October, 2010

David J. Kappos
*Director of the United States Patent and Trademark Office*